(12) United States Patent
Kim et al.

(10) Patent No.: US 10,921,258 B2
(45) Date of Patent: Feb. 16, 2021

(54) SURFACE-ENHANCED RAMAN SCATTERING PATCH AND RAMAN SPECTROSCOPY SYSTEM ADOPTING THE SAME

(71) Applicant: SAMSUNG ELECTRONICS CO., LTD., Suwon-si (KR)

(72) Inventors: Unjeong Kim, Osan-si (KR); Yeonsang Park, Seoul (KR); Younggeun Roh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/456,652

(22) Filed: Jun. 28, 2019

(65) Prior Publication Data

US 2020/0217796 A1   Jul. 9, 2020

(30) Foreign Application Priority Data

Jan. 3, 2019  (KR) .................. 10-2019-0000856

(51) Int. Cl.
*G01N 21/65* (2006.01)

(52) U.S. Cl.
CPC ... *G01N 21/658* (2013.01); *G01N 2201/0638* (2013.01); *G01N 2201/06113* (2013.01)

(58) Field of Classification Search
CPC ....... G01N 21/658; G01N 2201/06113; G01N 2201/0638
See application file for complete search history.

(56) References Cited

U.S. PATENT DOCUMENTS

| 8,599,489 B2 | 12/2013 | Shalaev et al. |
| 2016/0202123 A1 | 7/2016 | Jung et al. |
| 2018/0059026 A1 | 3/2018 | Ye et al. |
| 2018/0143140 A1 | 5/2018 | Kinser et al. |

(Continued)

FOREIGN PATENT DOCUMENTS

| CN | 107462565 A | 12/2017 |
| WO | 2016171962 A1 | 10/2016 |

OTHER PUBLICATIONS

"Seed-mediated synthesis of floriated Ag nanoplates as surface enhanced Raman scattering substrate for in situ molecular detection", Material Research Bulletin 97 (2018), p. 201-206 (Available online Sep. 6, 2017) by Tao Jiang et al . (Year: 2018).*

(Continued)

*Primary Examiner* — Jamil Ahmed
(74) *Attorney, Agent, or Firm* — Sughrue Mion, PLLC

(57) ABSTRACT

Provided is a surface-enhanced Raman scattering (SERS) patch configured to be brought into contact with an object and amplify Raman light generated from the object that is irradiated by laser light. The SERS patch includes a flexible substrate including a first surface facing the object and a second surface opposite to the first surface, a SERS layer provided on the first surface and configured to amplify the Raman light generated from the object based on surface plasmons, and a metalens provided on the first surface or the second surface of the flexible substrate, the metalens being configured to focus at least one of the laser light and the amplified Raman light in a propagation direction thereof.

16 Claims, 11 Drawing Sheets

(56) References Cited

U.S. PATENT DOCUMENTS

2018/0275321 A1* 9/2018 Kamali ............... G02B 5/0242

OTHER PUBLICATIONS

"Surface enhanced Raman spectroscopy on a flat graphene surface", PNAS, Jun. 12, 2012, vol. 019, No. 24, p. 9281-9286 by Weigao Xu et al. (Year: 2012).*
Communication dated Mar. 10, 2020 issued by the European Patent Office in European Application No. 19198401.2.
Tao Jiang, et al., "Seed-mediate synthesis of floriated Ag nanoplates as surface enhanced Raman scattering substrate for in situ molecular detection", Materials Research Bulletin, vol. 97, Sep. 6, 2017, XP055672319, pp. 201-206 (6 pages).
Weigao Xu, et al., "Surface enhanced Raman spectroscopy on a flat graphene surface", Proceedings of the National Academy of Sciences, vol. 109, No. 24, May 23, 2012, XP055424510, pp. 9281-9286 (6 pages).
Romano et al., "Surface-Enhanced Raman and Fluorescence Spectroscopy with an All-Dielectric Metasurface", The Journal of Physical Chemistry C, Aug. 2018, 9 pages total.
Gwo et al., "Plasmonic Metasurfaces for Nonlinear Optics and Quantitative SERS", ACS Photonics, vol. 3, Issue 8, 2016, pp. 1371-1384, 14 pages total.
Kim et al., "SERS-based pesticide detection by using nanofinger sensors", Nanotechnology, 26, No. 015502, 2015, pp. 1-7, 8 pages total.
Chen et al., "Flexible and Adhesive Surface Enhance Raman Scattering Active Tape for Rapid Detection of Pesticide Residues in Fruits and Vegetables", Analytical Chemistry, 88, 2016, pp. 2149-2155, 7 pages total.
Kumar et al., "Flexible and robust SERS active substrates for conformal rapid detection of pesticide residues from fruits", Sensors and Actuators B: Chemical, 241, 2017, pp. 577-583, 7 pages total.
Jeong et al., "High-resolution nanotransfer printing applicable to diverse surfaces via interface-targeted adhesion switching", Nature Communications, 5, No. 5387, 2014, pp. 1-12, 12 pages.
Liu et al., "Broadband Metasurfaces with Simultaneous Control of Phase and Amplitude", Advanced Materials, 26, 2014, pp. 5031-5036, 6 pages total.
Yu et al., "Light Propagation with Phase Discontinuities: Generalized Laws of Reflection and Refraction", Science, vol. 334, Oct. 21, 2011, pp. 333-337, 6 pages total.
Aieta et al., "Aberration-Free Ultrathin Flat Lenses and Axicons at Telecom Wavelengths Based on Plasmonic Metasurfaces", Nano Letters, 12, 2012, pp. 4932-4936, 5 pages total.
Sun et al., "Gradient-index meta-surfaces as a bridge linking propagating waves and surface waves", Nature Materials, 11, Apr. 1, 2012, pp. 1-6, 7 pages total.
Kim et al., "Amplitude Modulation of Anomalously Refracted Terahertz Waves with Gated-Graphene Metasurfaces", Advanced Optical Materials, 6, No. 1700507, 2017, pp. 1-7, 7 pages.
Chen et al., "Dual-polarity plasmonic metalens for visible light", Nature Communications, 3, No. 1198, 2012, pp. 1-6, 6 pages total.
Khorasaninejad et al., "Metalenses at visible wavelengths: Diffraction-limited focusing and subwavelength resolution imaging", Science, vol. 352, Issue 6290, Jun. 3, 2016, pp. 1190-1194, 6 pages total.
Chen et al., "A broadband achromatic metalens for focusing and imaging in the visible", Nature Nanotechnology, 2018, 8 pages total.
She et al., "Adaptive metalenses with simultaneous electrical control of focal length, astigmatism, and shift", Science Advances, 4, No. 9957, Feb. 23, 2018, pp. 1-7, 8 pages total.
Wang et al., "A broadband achromatic metalens in the visible", Nature Nanotechnology, vol. 13, Mar. 2018, pp. 227-232, 6 pages total.

* cited by examiner

SURFACE-ENHANCED RAMAN SCATTERING PATCH AND RAMAN SPECTROSCOPY SYSTEM ADOPTING THE SAME

CROSS-REFERENCE TO RELATED APPLICATION

This application claims priority from Korean Patent Application No. 10-2019-0000856, filed on Jan. 3, 2019, in the Korean Intellectual Property Office, the disclosure of which is incorporated herein in its entirety by reference.

BACKGROUND

1. Field

Example embodiments of the present disclosure relate to a surface-enhanced Raman scattering (SERS) patch and a Raman spectroscopy system adopting the SERS patch.

2. Description of the Related Art

Raman spectroscopy is very useful for sensing and quantifying materials by generating spectrums inherent to the materials. However, the efficiency of signal generation in Raman spectroscopy is low, and in most cases, materials to be detected exist in very small amounts. Thus, a technique called surface-enhanced Raman spectroscopy or surface-enhanced Raman scattering (SERS) has been proposed. SERS is a more powerful technique used to analyze materials with high sensitivity by greatly amplifying Raman spectrum signals. It has been known that it is theoretically possible to amplify Raman signals by a factor of about $10^6$ to about $10^{14}$ using the SERS technique.

However, the method of spraying a liquid material on a SERS substrate has limitations when detecting target materials existing in various conditions. In addition, it is difficult to maximize the effect of SERS because of optical loss or the like. Thus, it is needed to improve Raman signal generating and receiving efficiency.

SUMMARY

One or more example embodiments provide surface-enhanced Raman scattering (SERS) patches configured to improve Raman signal generating and receiving efficiency and more easily and accurately detect target materials in various environments.

Further, one or more example embodiments provide SERS patches in which a metalens configured to control an optical path and a SERS layer configured to amplify Raman light are combined.

Further still, one or more example embodiments provide Raman spectroscopy systems adopting the SERS patches.

Additional aspects will be set forth in part in the description which follows and, in part, will be apparent from the description, or may be learned by practice of example embodiments.

According to an aspect of an example embodiment, there is provided a surface-enhanced Raman scattering (SERS) patch configured to be brought into contact with an object and amplify Raman light generated from the object that is irradiated by laser light, the SERS patch including a flexible substrate including a first surface facing the object and a second surface opposite to the first surface, a SERS layer provided on the first surface and configured to amplify the Raman light generated from the object based on surface plasmons, and a metalens provided on the first surface or the second surface of the flexible substrate, the metalens being configured to focus at least one of the laser light and the amplified Raman light in a propagation direction thereof.

The SERS layer may be provided closer to the object than the metalens.

The metalens may be provided between the flexible substrate and the SERS layer.

The metalens may be further configured to focus the laser light on a side of the first surface of the flexible substrate.

The metalens may be further configured to focus the amplified Raman light on a side of the second surface of the flexible substrate.

The metalens may be further configured to focus the laser light on a side of the first surface of the flexible substrate and focus the amplified Raman light on a side of the second surface of the flexible substrate.

The SERS patch may further include a separator provided between the metalens and the SERS layer.

The SERS patch may further include a second metalens provided on the second surface of the flexible substrate, the second metalens being configured to focus at least one of the laser light and the amplified Raman light in the propagation direction thereof.

A structure of the second metalens may be different from a structure of the metalens.

The metalens may be provided on the second surface of the flexible substrate, and the flexible substrate may be provided between the SERS layer and the metalens.

The metalens may be further configured to focus the laser light on a side of the first surface of the flexible substrate.

The metalens may be further configured to focus the amplified Raman light on a side of the second surface of the flexible substrate.

The metalens may be further configured to focus the laser light on a side of the first surface of the flexible substrate and focus the amplified Raman light on a side of the second surface of the flexible substrate.

The metalens may include a dielectric metalens.

The metalens may include a nanostructure array having a subwavelength dimension.

The SERS layer may include metal nanostructures.

The SERS patch may further include a protective layer provided on the first surface of the flexible substrate and covering the SERS layer.

The protective layer may have a thickness of about 20 nm or less.

The flexible substrate may include a first substrate portion and a second substrate portion provided on the first substrate portion, wherein the SERS layer is provided on a surface of the first substrate portion, wherein the metalens is provided on a surface of the second substrate portion, and wherein the first substrate portion and the second substrate portion are provided between the SERS layer and the metalens.

The SERS patch may be an adhesive sticker type.

According to an aspect of another example embodiment, there is provided a Raman spectroscopy system including a surface-enhanced Raman scattering (SERS) patch configured to be brought into contact with an object and amplify Raman light generated from the object that is irradiated by laser light, the SERS patch including a flexible substrate including a first surface facing the object and a second surface opposite to the first surface, a SERS layer provided on the first surface and configured to amplify the Raman light generated from the object based on surface plasmons, and a metalens provided on the first surface or the second surface of the flexible substrate, the metalens being configured to focus at least one of the laser light and the amplified Raman light in a propagation direction thereof, a light source configured to emit the laser light toward the object which is brought into contact with the SERS patch, and a detector configured to detect Raman light which is generated from the object that is irradiated by the laser light and amplified by the SERS patch.

According to an aspect of another example embodiment, there is provided a surface-enhanced Raman scattering (SERS) patch configured to be brought into contact with an object and amplify Raman light generated from the object that is irradiated by laser light, the SERS patch including a flexible substrate including a first surface facing the object and a second surface opposite to the first surface, a SERS layer provided on the first surface and including nanostructures, the SERS layer being configured to amplify the Raman light generated from the object based on surface plasmons, and a metalens provided on the first surface or the second surface of the flexible substrate and including nanostructures, the metalens being configured to focus at least one of the laser light and the amplified Raman light in a propagation direction thereof.

The metalens may be further configured to focus the at least one of the laser light and the amplified Raman light based on changing an optical path of the at least one of the laser light and the amplified Raman light passing through the metalens by adjusting variation in phase of the at least one of the laser light and the amplified Raman light at boundary surfaces of the nanostructures.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
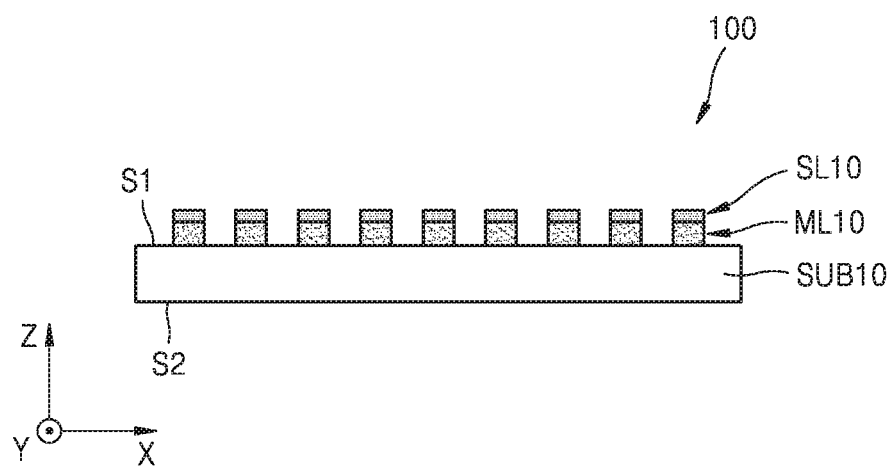
FIG. 1 is a cross-sectional view illustrating a surface-enhanced Raman scattering (SERS) patch according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, surface-enhanced Raman spectroscopy (SERS) patches and Raman spectroscopy systems adopting the SERS patches will be described according to example embodiments with reference to the accompanying drawings. In the drawings, the widths and thicknesses of layers or regions may be exaggerated for clarity or ease of description. In the following description, like reference numerals refer to like elements throughout.

FIG. 1 is a cross-sectional view illustrating a SERS patch 100 according to an example embodiment.

Referring to FIG. 1, the SERS patch 100 of the example embodiment may be brought into contact with an object to amplify Raman light generated from the object that is irradiated by laser light emitted to the object. The SERS patch 100 may include a flexible substrate SUB10. The flexible substrate SUB10 may have a first surface S1 facing the object and a second surface S2 on a side opposite the first surface S1. The SERS patch 100 may include a SERS layer SL10 provided on the first surface S1 of the flexible substrate SUB10. The SERS layer SL10 may amplify Raman light generated from the object using surface plasmons. The SERS patch 100 may further include a metalens ML10 provided on the first surface S1 or the second surface S2 of the flexible substrate SUB10. According to an example embodiment, the metalens ML10 may be provided on the first surface S1 of the flexible substrate SUB10. For example, the metalens ML10 may be arranged between the flexible substrate SUB10 and the SERS layer SL10. The metalens ML10 may focus at least one of the laser light irradiated on the object and the amplified Raman light scattered by the object and amplified by the SERS layer SL10 on a predetermined region in a propagation direction thereof.

The metalens ML10 may include a nanostructure array having a plurality of nanostructures. The nanostructure array may have a subwavelength dimension which is a dimension less than the wavelength of light in use. At least one of dimensions defining the shape of the nanostructures, for example, thickness, width, length, or inter-nanostructure spacing, may be a subwavelength dimension. To focus light, the metalens ML10 may change the optical path of light passing through the metalens M10 by adjusting variations in the phase of the light that occur at boundary surfaces of the nanostructures. Variations in the phase of light may differently occur at the nanostructures in different regions of the metalens ML10, and the optical path of the light may be adjusted using this phase variation difference. Optical characteristics of the metalens ML10 such as the operating wavelength of the metalens ML10 may be adjusted according to factors such as the dimensions and arrangement of the nanostructures of the metalens ML10.

The metalens ML10 may include a dielectric metalens. Metal-based metalenses, for example, a plasmonic metalens, have a relatively high optical loss in a visible wavelength range of about 400 nm to about 700 nm. However, the dielectric metalens may operate at a relatively low optical loss in the visible wavelength range. The nanostructures of the metalens ML10 may include a dielectric material, and examples of the dielectric material may include silicon oxides (SiOx), silicon nitrides (SiNx), titanium oxides (TiOx), aluminum oxides (AlOx), and hafnium oxides (HfOx). However, the nanostructures of the metalens ML10 are not limited thereto and may include another dielectric material. The metalens ML10 may operate with respect to light having a wavelength of about 300 nm to about 1500 nm or a wavelength of about 380 nm to about 800 nm. However, the metalens ML10 is not limited thereto.

The SERS layer SL10 may include a highly conductive metallic material for surface plasmon excitation to occur. For example, the SERS layer SL10 may include at least one selected from the group consisting of silver (Ag), gold (Au), aluminum (Al), copper (Cu), nickel (Ni), iron (Fe), cobalt (Co), zinc (Zn), titanium (Ti), ruthenium (Ru), rhodium (Rh), palladium (Pd), platinum (Pt), osmium (Os), iridium (Ir), and molybdenum (Mo), or the SERS layer SL10 may include an alloy or compound of at least one of the listed metallic materials. However, embodiments are not limited thereto. The SERS layer SL10 may include metal nanostructures. For example, the SERS layer SL10 may include metal nanoparticles, metal nanowires, metal nanorods, or various types of metal nanopatterns. However, embodiments are not limited thereto, and the SERS layer SL10 may include a metal thin film which may have a nano-scale thickness. In addition, the metal nanostructures may be at least partially embedded in a material layer.

The SERS layer SL10 may be placed closer to the object than the metalens ML10 is to the object. The SERS layer SL10 may be placed in direct contact with or in close contact with the object to be measured. The patterns and structures of the metalens ML10 and the SERS layer SL10 shown in FIG. 1 are illustrative examples that are simplified for ease of description. The patterns and structures of the metalens ML10 and the SERS layer SL10 may be variously modified. Example patterns and structures of the metalens ML10 and the SERS layer SL10 will be described later with reference to FIGS. 13 to 21.

Figure 2:
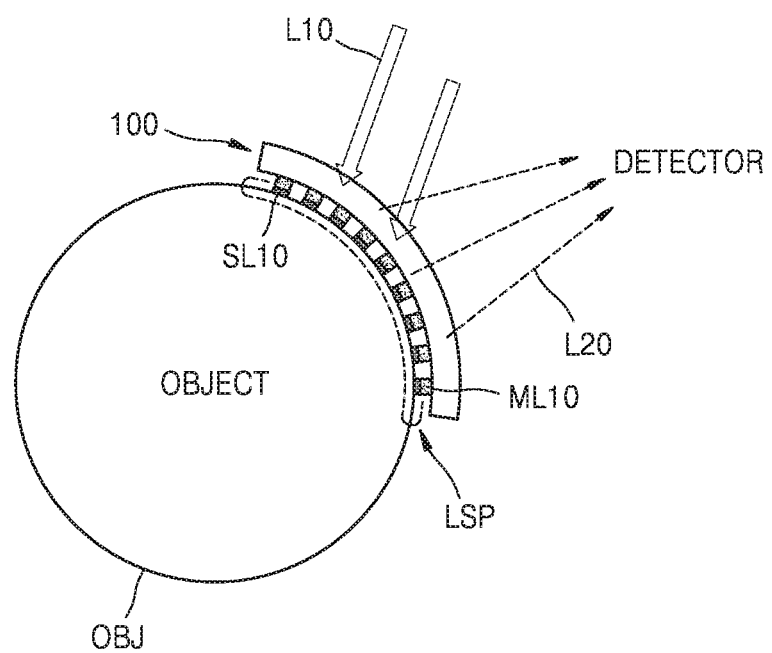
FIG. 2 is a schematic view illustrating an example of performing a measurement operation by attaching the SERS patch according to an example embodiment to an object.

FIG. 2 is a schematic view illustrating an example in which measurement is performed by attaching the SERS patch 100 according to an example embodiment to an object OBJ.

Referring to FIG. 2, the SERS patch 100 may be attached to the object OBJ to measure the object OBJ. At this time, the object OBJ may be irradiated with laser light L10, and Raman light generated from the object OBJ by the laser light L10 may be amplified by the surface plasmon effect of the SERS layer SL10. FIG. 2 illustrates localized surface plasmons LPS and amplified Raman light L20. The amplified Raman light L20 may be detected using a detector. In the example embodiment, an optical path control technique, for example, focusing light implemented by the metalens ML10 and a SERS analysis technique implemented by the SERS layer SL10 may be used together. Therefore, according to the example embodiment, efficiency of generating and receiving Raman signal (Raman light) may be improved.

The SERS patch 100 may be relatively easily applied to target materials existing in various environments. The object OBJ may be more easily measured by attaching the SERS patch 100 to any portion of the object OBJ to be analyzed. Since it is possible to perform a measurement operation in a state in which the SERS patch 100 is attached to the object OBJ, even a very small amount of a material may be analyzed more accurately and precisely. For example, the SERS patch according to example embodiments may be applied to various fields to detect pesticides remaining on agricultural products, test skin conditions, for example, related to beauty care, analyze/detect pollutants in living environments, or analyze/detect water pollution. For example, the SERS patch according to example embodiments may make it more easier to detect skin conditions, for example, skin lesions, acne, pimples, etc., measure pesticides remaining on the surfaces of agricultural products, and analyze pollutants in living environments. The SERS patch 100 may be of an attachable adhesive sticker type and may be a disposable or a near-disposable consumable.

The laser light L10 may be incident light for excitation. That is, the laser light L10 may be excitation laser light. The laser light L10 may have a wavelength within the range of about 300 nm to about 1500 nm or within the range of about 380 nm to about 800 nm. However, the laser light L10 is not limited thereto. Raman light that is scattered and generated from the object OBJ by the laser light L10 may include light shifted by a wavelength corresponding to the natural frequency of a specific material of the object OBJ.

The method of detecting a liquid material (sample) after spraying the liquid material onto a SERS substrate has limitations when detecting target materials existing in various environments. For example, when detecting pesticides remaining in very small amounts on the surfaces of fruits or vegetables, there is a limit in amplifying a Raman signal by bringing molecules of the pesticides into contact with a SERS structure formed on a general substrate. Furthermore, in a method of analyzing a very small amount of a target material (molecules) by attaching a SERS structure to the surface of the target material and detaching the SERS structure from the surface of the target material to transfer molecules from the surface of the target material to the SERS structure, it may be difficult to perform quantitative analysis because of molecules that remain on the surface of the target material without being separated from the surface of the target material. In addition, it is difficult to maximize the effect of SERS using SERS techniques of the related art because of factors such as optical loss.

However, according to an example embodiment, the optical path control technique, for example, focusing light implemented with the metalens ML10 and the SERS analysis technique implemented with the SERS layer SL10 may be used together, and thus efficiency of generating and receiving Raman signal may be improved. In addition, since the SERS patch 100 of the example embodiment is attachable to any portion of the object OBJ to be analyzed, the accuracy and precision of analysis may be improved and a measurement may be more simply performed. The SERS patch 100 is not limited to a method of performing a measurement operation by attaching the SERS patch 100 to a solid object. For example, measurement operations may be performed by a method of attaching and detaching the SERS patch 100 or placing a liquid sample on the SERS patch 100.

Example embodiments may be provided according to the function of the metalens ML10 based on the structure in which the metalens ML10 and the SERS layer SL10 are coupled to the single flexible substrate SUB10.

Figure 3:
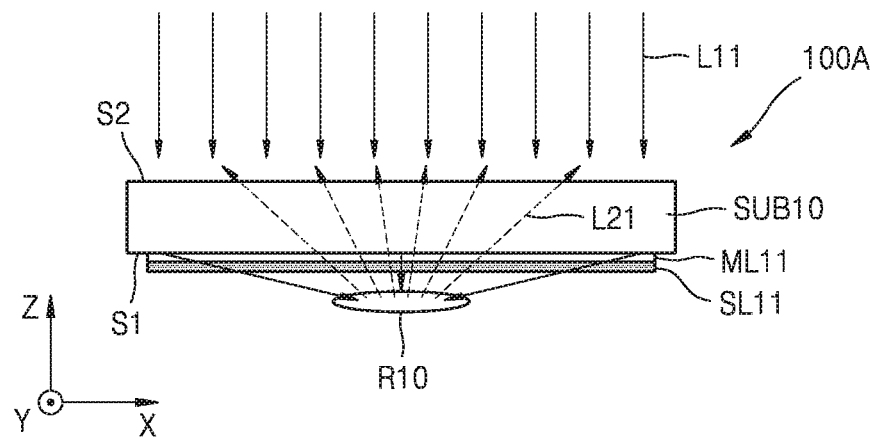
FIG. 3 is a cross-sectional view illustrating a SERS patch according to an example embodiment.

FIG. 3 is a cross-sectional view illustrating a SERS patch 100A according to an example embodiment.

Referring to FIG. 3, the SERS patch 100A may include a metalens ML11 and a SERS layer SL11 that are arranged on a first surface S1 of the flexible substrate SUB10 facing the object to be measured. The metalens ML11 may focus incident laser light L11 on a first region R10 of an object, but may not focus amplified Raman light L21.

Figure 4:
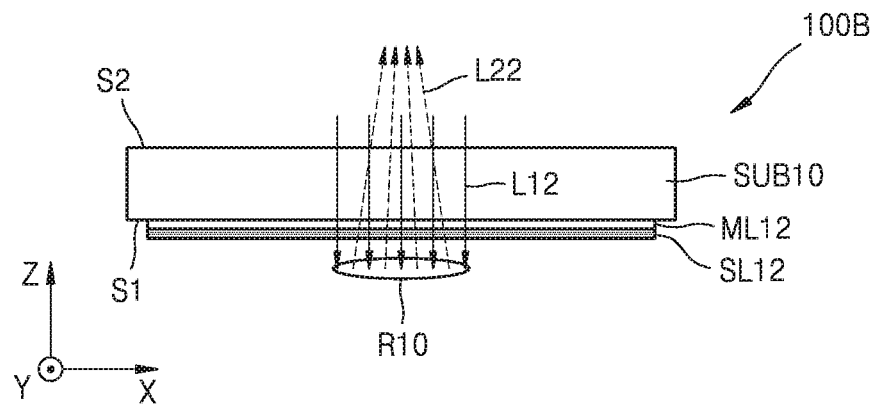
FIG. 4 is a cross-sectional view illustrating a SERS patch according to another example embodiment.

FIG. 4 is a cross-sectional view illustrating a SERS patch 100B according to another example embodiment.

Referring to FIG. 4, the SERS patch 100B may include a metalens ML12 and a SERS layer SL12 that are arranged on a first surface S1 of a flexible substrate SUB10 facing the object to be measured. The metalens ML12 may focus amplified Raman light L22 on a side opposite a first region R10, that is, on a side of a detector, but may not focus incident laser light L12.

Figure 5:
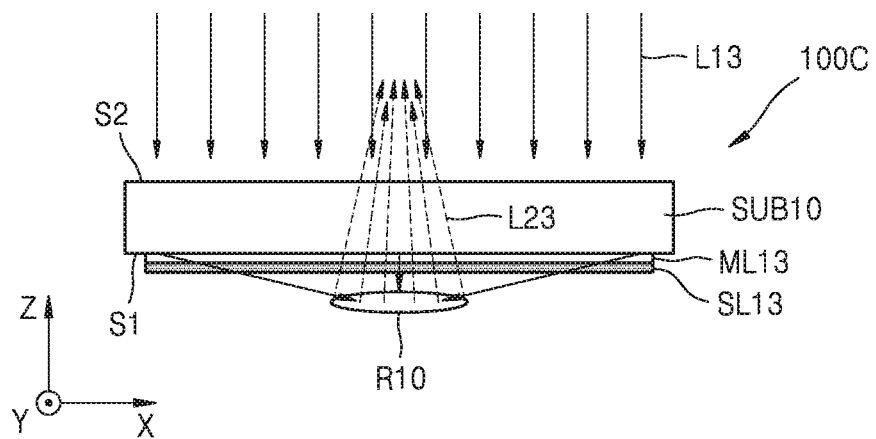
FIG. 5 is a cross-sectional view illustrating a SERS patch according to another example embodiment.

FIG. 5 is a cross-sectional view illustrating a SERS patch 100C according to another example embodiment.

Referring to FIG. 5, the SERS patch 100C may include a metalens ML13 and a SERS layer SL13 that are arranged on a first surface S1 of a flexible substrate SUB10 facing the object to be measured. The metalens ML13 may focus incident laser light L13 on a first region R10 and may focus amplified Raman light L23 on a side opposite the first region R10.

Figure 6:
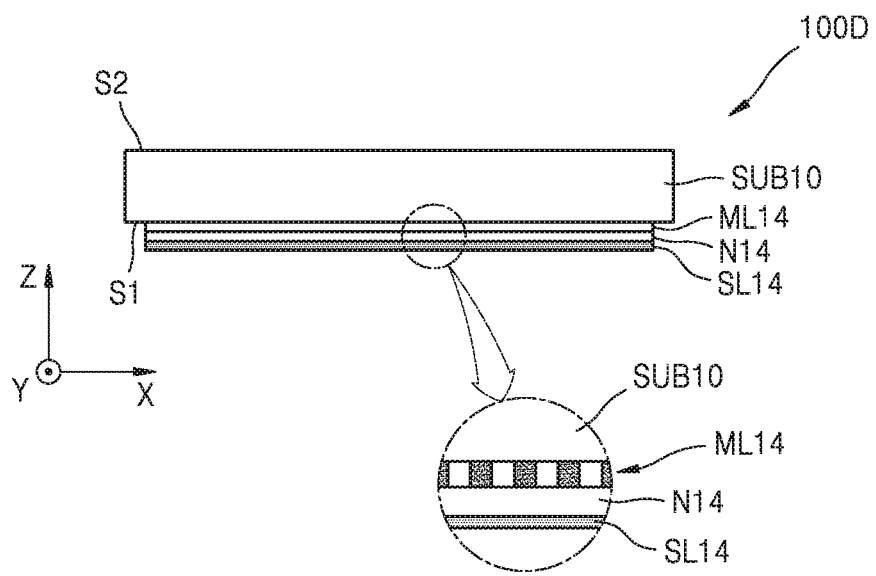
FIG. 6 is a cross-sectional view illustrating a SERS patch according to another example embodiment.

FIG. 6 is a cross-sectional view illustrating a SERS patch 100D according to another example embodiment.

Referring to FIG. 6, the SERS patch 100D may include a metalens ML14 and a SERS layer SL14 that are arranged on a first surface S1 of a flexible substrate SUB10, and may further include a separator N14 between the metalens ML14 and the SERS layer SL14. The separator N14 may include an insulating material and may have a thickness of, for example, several tens of nanometers (nm) to several tens of micrometers (μm). Since the distance between the metalens ML14 and an object increases by the separator N14, it may be more easier to focus light using the metalens ML14.

Figure 7:
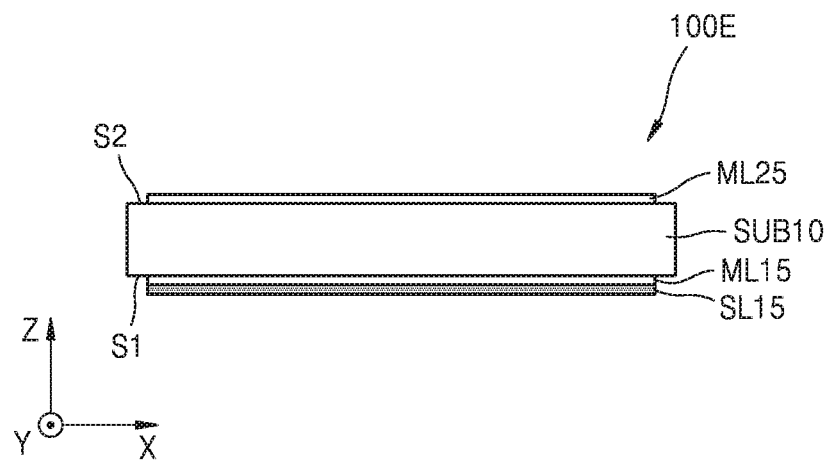
FIG. 7 is a cross-sectional view illustrating a SERS patch according to another example embodiment.

FIG. 7 is a cross-sectional view illustrating a SERS patch 100E according to another example embodiment.

Referring to FIG. 7, the SERS patch 100E may include a first metalens ML15 and a SERS layer SL15 that are arranged on a first surface S1 of a flexible substrate SUB10 facing the object to be measured. In addition, the SERS patch 100E may further include a second metalens ML25 arranged on a second surface S2 of the flexible substrate SUB10 opposite to the first surface S1. As described with reference to FIGS. 3 to 5, the first metalens ML15 may focus at least one of laser light emitted to the object and amplified Raman light in a propagation direction thereof. In addition, the second metalens ML25 may focus at least one of laser light and amplified Raman light in a propagation direction thereof. In this case, the second metalens ML25 may have a structure or dimension different from that of the first metalens ML15, and thus the first metalens ML15 and second metalens ML25 may have different characteristics. SERS may be improved by controlling the optical path of light using the two metalenses, that is, the first metalens ML15 and the second metalens ML25.

In the example embodiments described with reference to of FIGS. 3 to 6, both the metalens and the SERS layer are provided on the first surface S1 of the substrate SUB10 facing the object to be measured. However, embodiments are not limited thereto, and the SERS layer may be provided on the first surface S1 of the flexible substrate SUB10 facing the object to be measured, and the metalens may be provided on the second surface S2 of the flexible substrate SUB10 opposite to the first surface S1.

Figure 8:
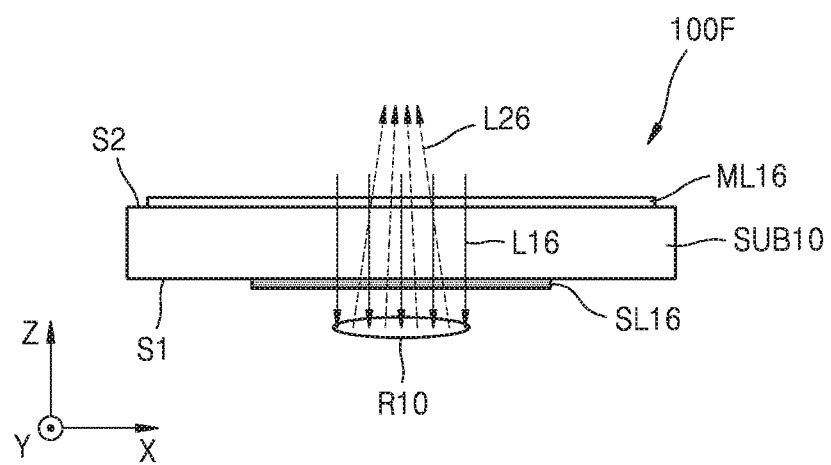
FIG. 8 is a cross-sectional view illustrating a SERS patch according to another example embodiment.

FIG. 8 is a cross-sectional view illustrating a SERS patch 100F according to another example embodiment.

Referring to FIG. 8, the SERS patch 100F may include a SERS layer SL16 arranged on a first surface S1 of a flexible substrate SUB10 facing the object to be measured and a metalens ML16 arranged on a second surface S2 of the flexible substrate SUB10 opposite to the first surface S1. The metalens ML16 may focus amplified Raman light L26 on a side opposite a first region R10, but may not focus incident laser light L16.

Figure 9:
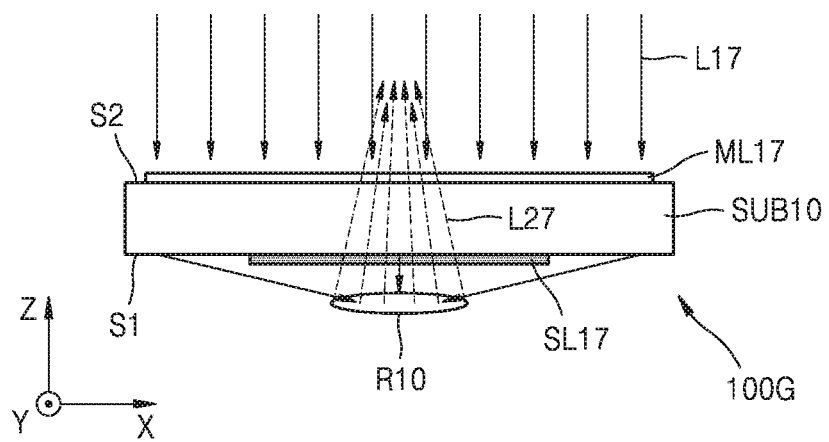
FIG. 9 is a cross-sectional view illustrating a SERS patch according to another example embodiment.

FIG. 9 is a cross-sectional view illustrating a SERS patch 100G according to another example embodiment.

Referring to FIG. 9, the SERS patch 100G may include a SERS layer SL17 arranged on a first surface S1 of a flexible substrate SUB10 facing the object to be measured and a metalens ML17 arranged on a second surface S2 of the flexible substrate SUB10 opposite to the first surface S1. The metalens ML17 may focus incident laser light L17 on a first region R10 and may focus amplified Raman light L27 on a side opposite the first region R10.

Figure 10:
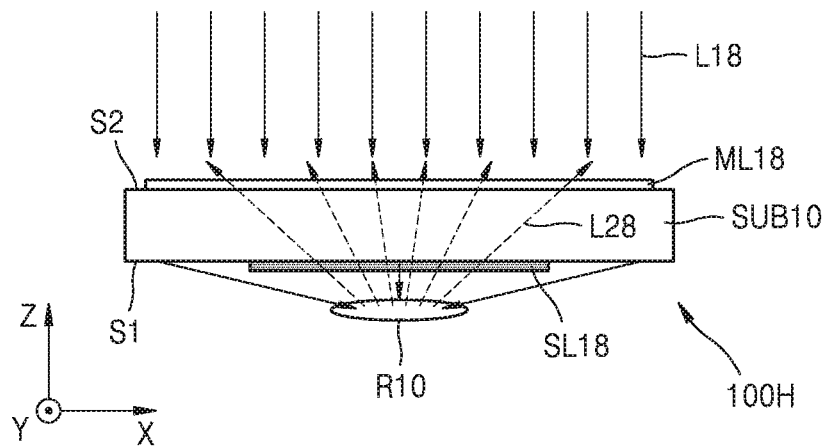
FIG. 10 is a cross-sectional view illustrating a SERS patch according to another example embodiment.

FIG. 10 is a cross-sectional view illustrating a SERS patch 100H according to another example embodiment.

Referring to FIG. 10, the SERS patch 100H may include a SERS layer SL18 arranged on a first surface S1 of a flexible substrate SUB10 facing the object to be measured and a metalens ML18 arranged on a second surface S2 of the flexible substrate SUB10 opposite to the first surface S1. The metalens ML18 may focus incident laser light L18 on a first region R10 of an object and may not focus amplified Raman light L28.

The flexible substrates SUB10 of the example embodiments described with reference to FIGS. 8 to 10 may have a thickness within the range of several micrometers (μm) or greater, for example, within the range of several micrometers (μm) to several hundreds of micrometers (μm). Since the distance from between the metalenses ML16, ML17, and ML18 to an object is increased by the flexible substrates SUB10, it may be more easier to focus light using the metalenses ML16, ML17, and ML18.

Figure 11:
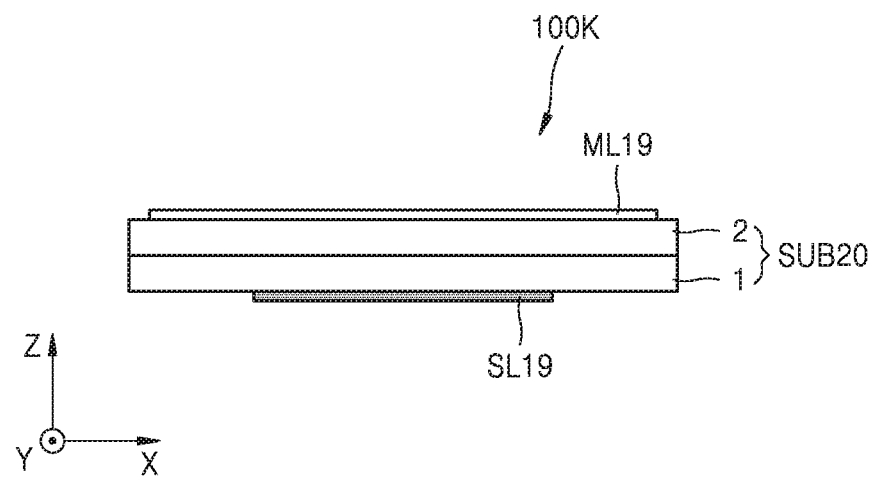
FIG. 11 is a cross-sectional view illustrating a SERS patch according to another example embodiment.

FIG. 11 is a cross-sectional view illustrating a SERS patch 100K according to another example embodiment.

Referring to FIG. 11, a flexible substrate SUB10 of the SERS patch 100K may include a first substrate portion 1 and a second substrate portion 2 attached to the first substrate portion 1. Both the first substrate portion 1 and the second substrate portion 2 may include a flexible material. A SERS layer SL19 may be provided on a surface of the first substrate portion 1, and a metalens ML19 may be provided on a surface of the second substrate portion 2. The first substrate portion 1 and the second substrate portion 2 may be arranged between the SERS layer SL19 and the metalens ML19.

The SERS patch 100K may be provided by forming the SERS layer SL19 on the first substrate portion 1, forming the metalens ML19 on the second substrate portion 2, and then bonding the first substrate portion 1 and the second substrate portion 2 to each other. Based on the use of the two substrate portions, that is, the first substrate portion 1 and second substrate portion 2, the SERS patch 100K may be more easily manufactured. The use of two substrate portions such as the first substrate portion 1 and the second substrate portion 2 may be applied to other example embodiments.

Figure 12:
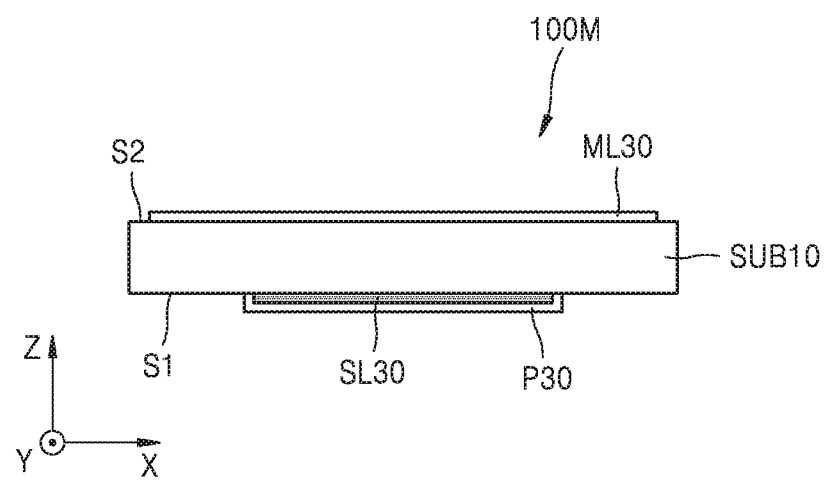
FIG. 12 is a cross-sectional view illustrating a SERS patch according to another example embodiment.

FIG. 12 is a cross-sectional view illustrating a SERS patch 100M according to another example embodiment.

Referring to FIG. 12, the SERS patch 100M may include a SERS layer SL30 arranged on a first surface S1 of a flexible substrate SUB10 facing the object to be measured, a protective layer P30 covering the SERS layer SL30, and a metalens ML30 arranged on a second surface S2 of the flexible substrate SUB10 opposite to the first surface S1. The protective layer P30 may have a relatively small thickness within the range of about 20 nm or less, or within the range of about 15 nm or less, and the protective layer P30 may include an insulating material. The protective layer P30 may prevent oxidation of a metal included in the SERS layer SL30. In addition, based on the protective layer P30 having a relatively small thickness and covering the SERS layer SL30, field enhancement may be maximized by the SERS layer SL30. The protective layer P30 may be applied to other example embodiments.

Figure 13:
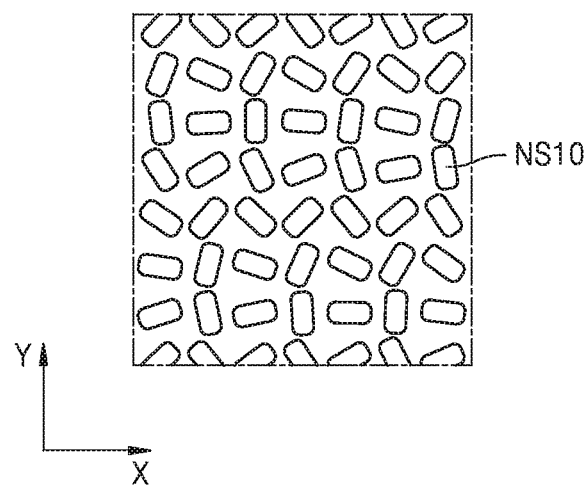
FIG. 13 is a plan view illustrating a portion of a metalens that may be applied to a SERS patch according to an example embodiment.

FIG. 13 is a plan view illustrating a portion of a metalens that may be applied to a SERS patch according to an example embodiment.

Referring to FIG. 13, the metalens may include a dielectric metalens and may include a plurality of nanostructures NS10. The nanostructures NS10 may be two-dimensionally arranged. The arrangement direction of the nanostructures NS10 may be gradually changed from a first region to a second region of the metalens. The optical path of light passing through the metalens may be varied by adjusting variations in the phase of light that occur in the nanostructures NS10.

Figure 14:
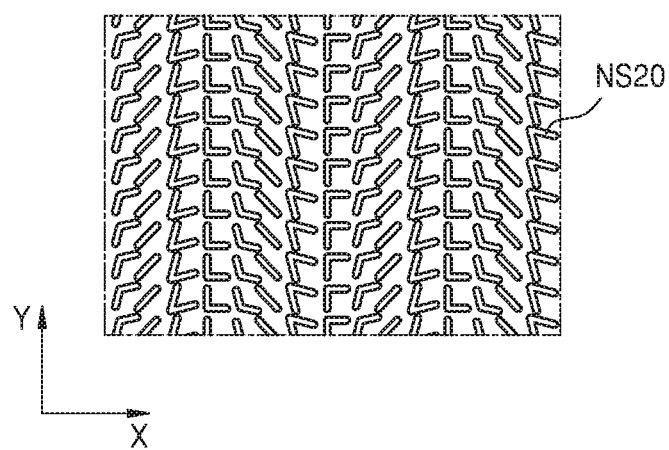
FIG. 14 is a plan view illustrating a portion of a metalens that may be applied to a SERS patch according to another example embodiment.
Figure 15:
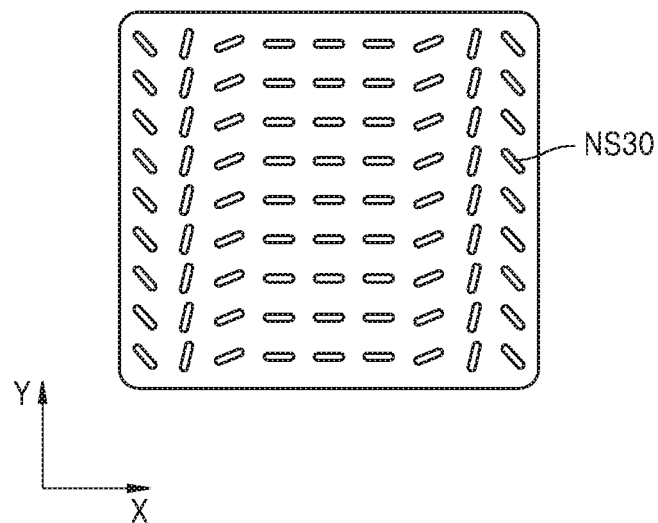
FIG. 15 is a plan view illustrating a portion of a metalens that may be applied to a SERS patch according to another example embodiment.

The shape and arrangement of the nanostructures NS10 of the metalens may be variously modified. Modification examples thereof are illustrated in FIGS. 14 and 15. In FIG. 14, a plurality of nanostructures NS20 are arranged, and in FIG. 15, a plurality of nanostructures NS30 are arranged. The characteristics of a metalens may be varied according to the shape, dimensions, arrangement of nanostructures of the metalens. The nanostructures may have various shapes such as a ring shape, a partial ring shape, an H-shape, an I-shape, or a U-shape. In addition, a metalens may include a single nanostructure array or may include a plurality of nanostructure arrays that are stacked.

Figure 16:
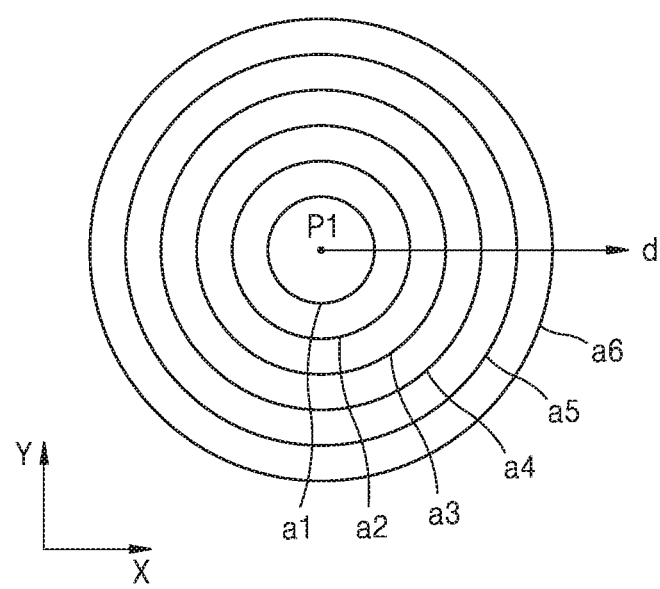
FIG. 16 is a plan view illustrating a metalens that may be applied to a SERS patch according to another example embodiment.

FIG. 16 is a plan view illustrating a metalens that may be applied to a SERS patch according to another example embodiment.

Referring to FIG. 16, the meta-lens may include a plurality of regions a1 to a6 arranged in a direction away from a reference point P1 in a direction in which d increases. The regions a1 to a6 may have a round shape around the reference point P1. A plurality of nanostructures may be arranged in each of the regions a1 to a6. The nanostructures may have different dimensions, for example, spacings or widths, or may be differently arranged in the regions a1 to a6. The arrangement of the nanostructures may gradually vary in a direction away from the reference point P1. Light may be focused using the metalens.

Figure 17:
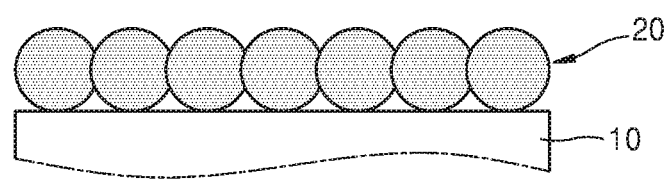
FIG. 17 is a cross-sectional view illustrating a SERS layer that may be applied to a SERS patch according to an example embodiment.

FIG. 17 is a cross-sectional view illustrating a SERS layer that may be applied to a SERS patch according to an example embodiment.

Referring to FIG. 17, the SERS layer may include a plurality of nanoparticles 20 provided on a substrate 10. The nanoparticles 20 may include at least one metal selected from the group consisting of Ag, Au, Al, Cu, Ni, Fe, Co, Zn, Ti, Ru, Rh, Pd, Pt, Os, Ir, and Mo.

Figure 18:
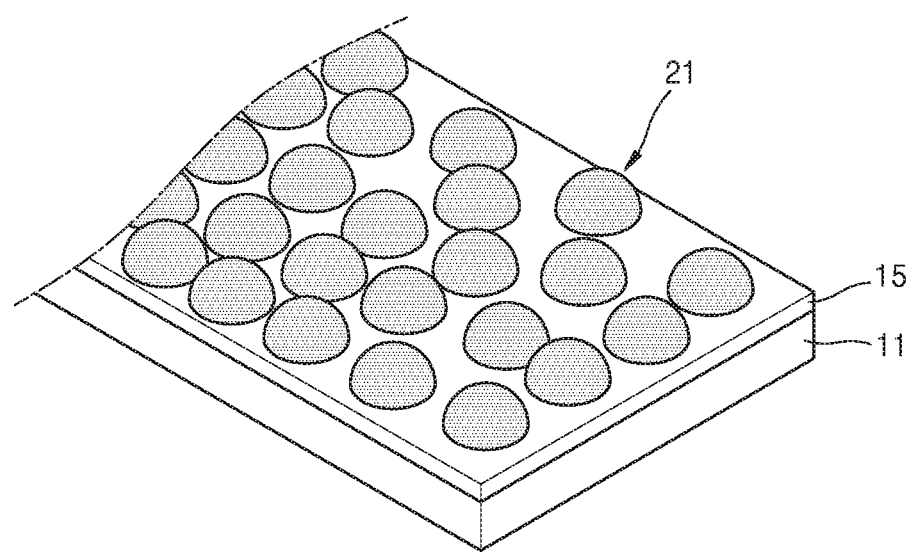
FIG. 18 is a perspective view illustrating a SERS layer that may be applied to a SERS patch according to another example embodiment.

FIG. 18 is a perspective view illustrating a SERS layer that may be applied to a SERS patch according to another example embodiment.

Referring to FIG. 18, the SERS layer may include a material layer 15 provided on a substrate 11 and a plurality of nanoparticles 21 partially embedded in the material layer 15. The material layer 15 may include a polymer layer.

Figure 19:
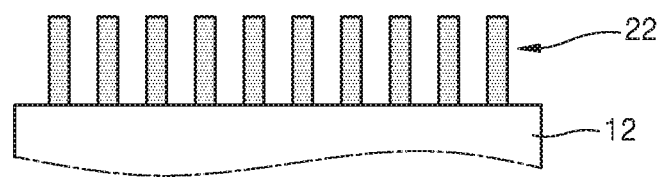
FIG. 19 is a cross-sectional view illustrating a SERS layer that may be applied to a SERS patch according to another example embodiment.

FIG. 19 is a cross-sectional view illustrating a SERS layer that may be applied to a SERS patch according to another example embodiment.

Referring to FIG. 19, the SERS layer may include a plurality of nanowires 22 provided on a substrate 12. The nanowires 22 may include at least one metal selected from the group consisting of Ag, Au, Al, Cu, Ni, Fe, Co, Zn, Ti, Ru, Rh, Pd, Pt, Os, Ir, and Mo.

Figure 20:
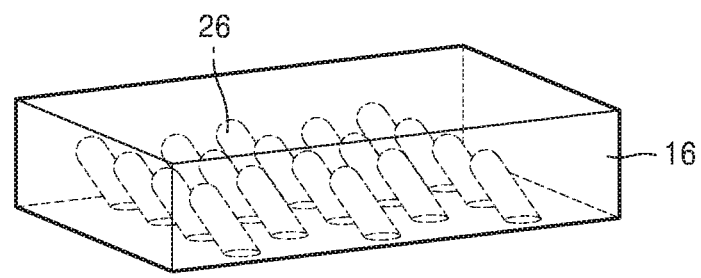
FIG. 20 is a perspective view illustrating a SERS layer that may be applied to a SERS patch according to another example embodiment.

FIG. 20 is a perspective view illustrating a SERS layer that may be applied to a SERS patch according to another example embodiment.

Referring to FIG. 20, the SERS layer may include a material layer 16 and a plurality of nanowires 26 at least partially embedded in the material layer 16. The material layer 16 may include a polymer layer. In FIG. 20, the nanowires 26 are completely embedded in the material layer 16. However, portions of the nanowires 26 may protrude outward from the material layer 16.

Figure 21:
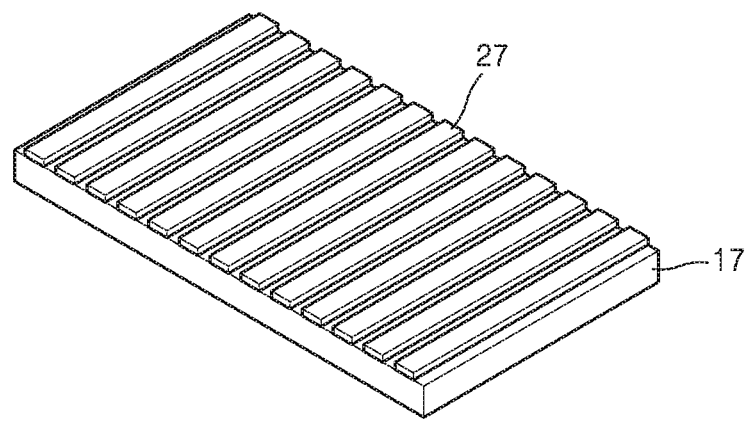
FIG. 21 is a perspective view illustrating a SERS layer that may be applied to a SERS patch according to another example embodiment.

FIG. 21 is a perspective view illustrating a SERS layer that may be applied to a SERS patch according to another example embodiment.

Referring to FIG. 21, the SERS layer may include a plurality of nanopatterns 27 provided on a substrate 17. The nanopatterns 27 may include at least one metal selected from the group consisting of Ag, Au, Al, Cu, Ni, Fe, Co, Zn, Ti, Ru, Rh, Pd, Pt, Os, Ir, and Mo. In FIG. 21, the nanopatterns 27 are shown as nano-scale line patterns. However, the shape of the nanopatterns 27 may be variously modified.

Figure 22:
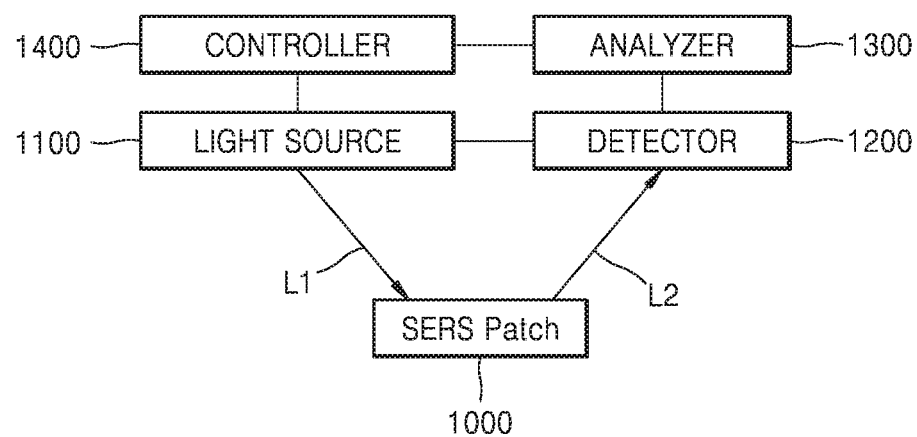
FIG. 22 is a block diagram schematically illustrating a Raman spectroscopy system adopting a SERS patch according to an example embodiment.

FIG. 22 is a block diagram schematically illustrating a Raman spectroscopy system adopting a SERS patch 1000 according to an example embodiment.

Referring to FIG. 22, according to the example embodiment, the Raman spectroscopy system may include the SERS patch 1000 and a light source 1100 configured to emit laser light L1 toward an object which is brought into contact with the SERS patch 1000. The light source 1100 may include a laser light source. In addition, the Raman spectroscopy system may include a detector 1200 configured to detect Raman light L2 which is generated from the object that is irradiated by the laser light L1 and is amplified by the SERS patch 1000. In addition, the Raman spectroscopic system of the embodiment may further include an analyzer 1300 connected to the detector 1200, and a controller 1400 connected to the analyzer 1300 and the light source 1100. The analyzer 1300 and the controller 1400 may be implemented by a processor. The Raman spectroscopy system may further include an input/output interface, a memory, a communication unit, or the like.

The SERS patches of the example embodiments may improve efficiency of generating and receiving Raman signal and may be used to more easily and accurately detect target materials in various environments. Each of the SERS patches may maximize the effect of SERS and optical efficiency owing to the combination of the metalens configured to control an optical path and the SERS layer configured to amplify Raman light.

High-performance Raman spectroscopy systems may be provided using the SERS patches of the example embodiments.

It will be understood by those of ordinary skill in the art that the configurations of the SERS patches and the Raman spectroscopy system described with reference to FIGS. 1 to 22 may be variously modified. For example, a SERS patch may use a rigid substrate instead of a flexible substrate. In this case, the SERS patch may be attached to or placed on an object having a flat surface to perform a measurement operation. In addition, the SERS patch may include, for example, a SERS substrate, a SERS member, a SERS structure, SERS tape, or a SERS sticker, and the metalens may include, for example, a nanostructure focusing lens or a nanostructure array lens.

It should be understood that embodiments described herein should be considered in a descriptive sense only and not for purposes of limitation. Descriptions of features or aspects within each embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. A surface-enhanced Raman scattering (SERS) patch configured to be brought into contact with an object and amplify Raman light generated from the object that is irradiated by laser light, the SERS patch comprising:
   a flexible substrate comprising a first surface facing the object and a second surface opposite to the first surface;
   a SERS layer spaced apart from the flexible substrate on the first surface and configured to amplify the Raman light generated from the object based on surface plasmons;
   a first metalens that contacts both the flexible substrate and the SERS layer on the first surface, the first metalens being configured to focus at least one of the laser light and the amplified Raman light in a propagation direction thereof; and
   a second metalens provided on the second surface of the flexible substrate, the second metalens being configured to focus at least one of the laser light and the amplified Raman light in the propagation direction thereof,
   wherein a structure of the second metalens is different from a structure of the first metalens.

2. The SERS patch of claim 1, wherein the SERS layer is provided closer to the object than the first metalens.

3. The SERS patch of claim 1, wherein the first metalens is provided on the first surface of the flexible substrate between the flexible substrate and the SERS layer.

4. The SERS patch of claim 3, wherein the first metalens is further configured to focus the laser light on a side of the first surface of the flexible substrate.

5. The SERS patch of claim 3, wherein the first metalens is further configured to focus the amplified Raman light on a side of the second surface of the flexible substrate.

6. The SERS patch of claim 3, wherein the first metalens is further configured to focus the laser light on a side of the first surface of the flexible substrate and focus the amplified Raman light on a side of the second surface of the flexible substrate.

7. The SERS patch of claim 1, wherein the second metalens is further configured to focus the laser light on a side of the flexible substrate that is facing the object.

8. The SERS patch of claim 1, wherein the second metalens is further configured to focus the amplified Raman light on a side of the second surface of the flexible substrate.

9. The SERS patch of claim 1, wherein the second metalens is further configured to focus the laser light on a side of the first surface of the flexible substrate the object and focus the amplified Raman light on a side of the second surface of the flexible substrate.

10. The SERS patch of claim 1, wherein at least one of the first metalens and the second metalens comprises a dielectric metalens.

11. The SERS patch of claim 1, wherein at least one of the first metalens and the second metalens comprises a nanostructure array having a subwavelength dimension.

12. The SERS patch of claim 1, wherein the SERS layer comprises metal nanostructures.

13. The SERS patch of claim 1, further comprising a protective layer provided on the first surface of the flexible substrate and covering the SERS layer.

14. The SERS patch of claim 13, wherein the protective layer has a thickness of about 20 nm or less.

15. The SERS patch of claim 1, wherein the SERS layer is an adhesive sticker type.

16. A Raman spectroscopy system comprising:
   a surface-enhanced Raman scattering (SERS) patch configured to be brought into contact with an object and amplify Raman light generated from the object that is irradiated by laser light, the SERS patch comprising:
      a flexible substrate comprising a first surface facing the object and a second surface opposite to the first surface;
      a SERS layer provided on the first surface and configured to amplify the Raman light generated from the object based on surface plasmons; and
      a first metalens that contacts both the flexible substrate and the SERS layer on the first surface, the first metalens being configured to focus at least one of the laser light and the amplified Raman light in a propagation direction thereof;
   a second metalens provided on the second surface of the flexible substrate, the second metalens being configured to focus at least one of the laser light and the amplified Raman light in the propagation direction thereof;
   a light source configured to emit the laser light toward the object which is brought into contact with the SERS patch; and a detector configured to detect the Raman light which is generated from the object that is irradiated by the laser light and amplified by the SERS patch, and wherein a structure of the second metalens is different from a structure of the first metalens.

* * * * *